US008259964B2

(12) United States Patent
Ueno et al.

(10) Patent No.: US 8,259,964 B2
(45) Date of Patent: Sep. 4, 2012

(54) SOUND DEVICE

(75) Inventors: Masato Ueno, Hamamatsu (JP); Kosuke Takata, Hamamatsu (JP); Masayuki Takagi, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 0 days.

(21) Appl. No.: 13/164,679

(22) Filed: Jun. 20, 2011

(65) Prior Publication Data

US 2011/0243351 A1 Oct. 6, 2011

Related U.S. Application Data

(62) Division of application No. 11/654,484, filed on Jan. 17, 2007.

(51) Int. Cl.

| | |
|---|---|
| ***H04B 1/00*** | (2006.01) |
| ***H02B 1/00*** | (2006.01) |
| ***H04R 5/00*** | (2006.01) |
| ***H04R 29/00*** | (2006.01) |

(52) U.S. Cl. .............. 381/119; 381/123; 381/1; 381/17; 381/18; 381/19; 381/58; 381/59

(58) Field of Classification Search .......... 381/1, 17–19, 381/123, 119, 56–58, 77, 71.8
See application file for complete search history.

(56) References Cited

U.S. PATENT DOCUMENTS 5,789,689 A * 8/1998 Doidic et al. .................. 84/603

* cited by examiner

*Primary Examiner* — Devona Faulk
(74) *Attorney, Agent, or Firm* — Foley & Lardner LLP

(57) ABSTRACT

A sound device includes an input terminal for electronic signal input; a line out terminal adapted to output electronic signals input on the input terminal to an external area; a delay arrangement adapted to delay electronic signals input on the input terminal for a certain time; a main output arrangement adapted to output electronic signals delayed by the delay arrangement. The delay arrangement delays signals in order to accommodate a time difference between (1) electronic signals output from an external sound device connected with the line output terminal and (2) electronic signals output from the main output arrangement. The time difference between sound that is output from the sound device and the one that is output from an external sound device that is connected with line connection terminal can be eliminated. Thus, it can prevent sound quality decrease due to time difference from happening.

18 Claims, 5 Drawing Sheets

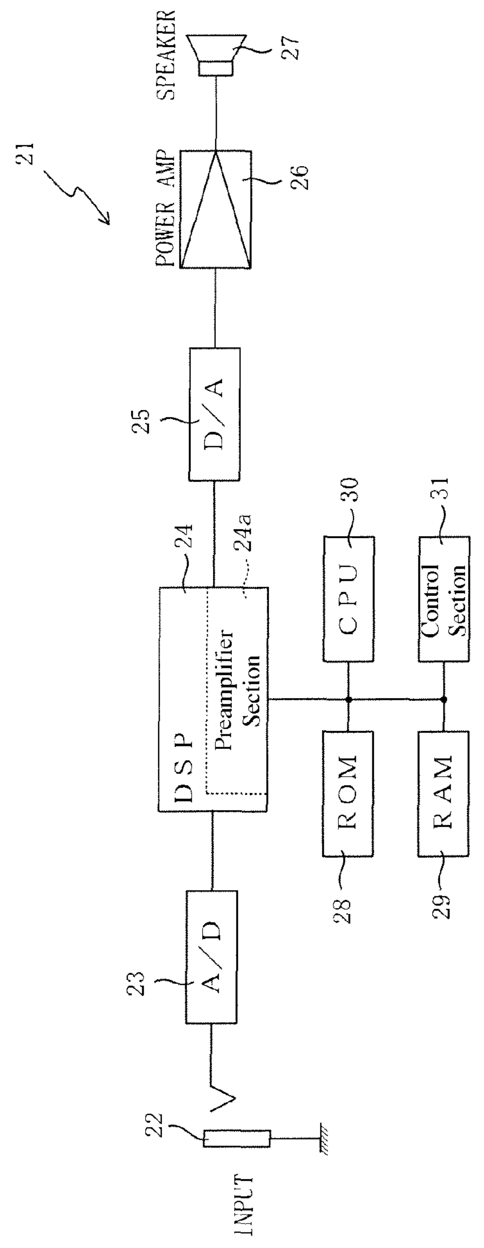
FIGURE 2 ( a )
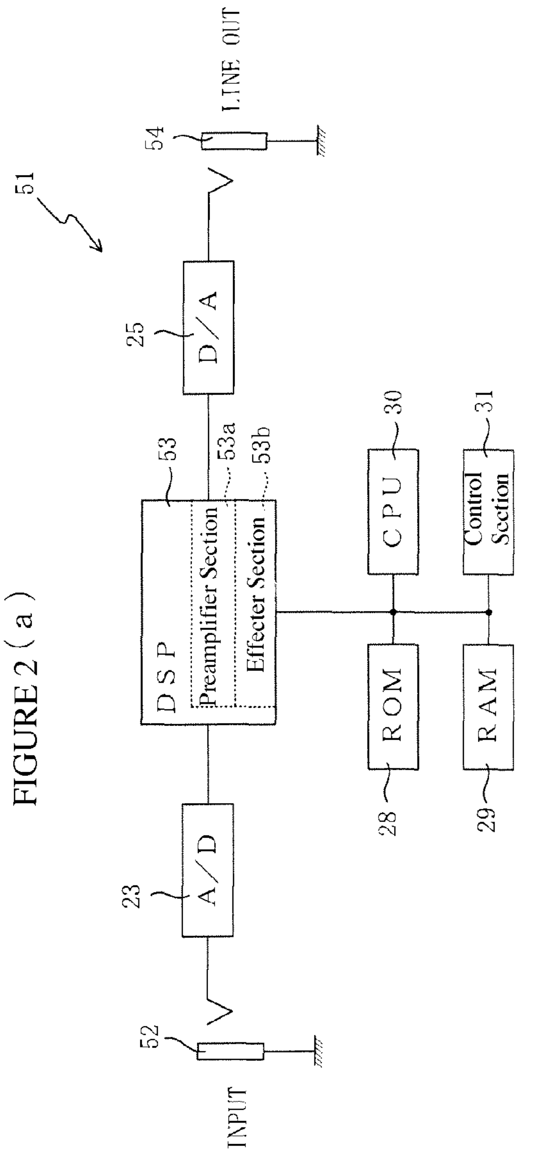
FIGURE 2 ( b )

SOUND DEVICE

This application is a Divisional of U.S. application Ser. No. 11/654,484, filed Jan. 17, 2007, incorporated herein by reference in its entirety.

BACKGROUND

The present invention relates generally to the field of sound devices. In particular, embodiments of the present invention relate to sound devices that prevent sound quality from decreasing when an external sound device is connected to the sound device.

A sound device that converts analog signals to digital signals and processes them has been traditionally known. U.S. Pat. No. 5,789,689 has published the technology to (1) convert electronic signals that were input to digital signals with an analog-to-digital (A/D) converter, (2) process signals with digital signal processing (the DSP), (3) add various sound effects, (4) convert processed signal data to analog signals with digital-to-analog (D/A) converter, and (5) generate sound with speaker that is connected with the D/A converter.

When the device, however, is connected with an external sound device that converts analog signals to digital signals for processing, the A/D converter and D/A converter that are mounted on the external sound device create a delay, and a time difference between sound that is generated from a speaker connected with the sound device and sound that is generated from a speaker connected with the external sound device. As a result, sound that is generated from each speaker would interfere with each other and will change sound quality and, eventually, decrease the sound quality.

SUMMARY OF THE DISCLOSURE

Embodiments of the invention are intended to solve such issues and to provide sound devices that prevent sound from interfering with each other, changing sound quality, and decreasing the sound quality when the sound device is connected with an external sound device that converts analog signals to digital signals for processing.

In one aspect of the invention, a sound device comprises an input terminal for electronic signal input; a line out terminal adapted to output electronic signals input on the input terminal to an external area; a delay arrangement adapted to delay electronic signals input into the input terminal, for a certain time; a main output arrangement adapted to output electronic signals delayed by the delay arrangement. The delay arrangement delays signals in order to accommodate a time difference between (1) electronic signals output from an external sound device connected with the line output terminal and (2) electronic signals output from the main output arrangement. The time difference between sound that is output from the sound device and the one that is output from an external sound device that is connected with line connection terminal can be eliminated. Thus, it can prevent sound quality decrease due to time difference from happening.

In one embodiment, the sound device includes a delay control arrangement adapted to configure if the delay arrangement should delay the signals in the sound device. Thus, the delay processing from the sound device can be done only when there is delay from an external sound device that is connected with line out terminal.

The sound device may include a line terminal detect arrangement adapted to detect if the line out terminal is connected with an external sound device. The delay control arrangement configures the delay arrangement (1) to delay the signals when the line terminal detect arrangement detects the line out terminal is connected with an external sound device, and (2) not to delay the signals when the line out terminal is not connected with an external sound device. Thus, the delay processing from the sound device can be done only when the line out terminal is connected with an external sound device.

In another embodiment, the sound device includes a control terminal adapted to configure whether or not the delay arrangement should delay the signals. The delay control arrangement configures the delay arrangement (1) to delay the signals when the control terminal is configured to delay, and (2) not to delay when the control terminal is configured not to delay. Thus, a user can configure whether or not it should delay at his/her will.

In one embodiment, the sound device further includes a delay time configuration arrangement that configures a delay time of the delay arrangement. A user may configure delay time of the delay arrangement depending on delay time that external sound device connected with the line out terminal has. Thus, a time difference between sound output from the sound device and sound output from an external sound device can be eliminated.

In one embodiment, the delay time configuration arrangement is adapted to configure a longer delay time of the delay arrangement when the line terminal detect arrangement detects the line out terminal is connected with an external sound device than when the terminal detect arrangement detects it is not connected with an external sound device. The time difference between sound output from the sound device and the one output from an external sound device can be eliminated. Thus, it can prevent sound quality from decreasing.

In one embodiment, the sound device also includes a power amplifier connected with the main output arrangement. Thus, it can provide a compact sound device that has built-in power amplifier. The sound device may also include a speaker that is connected with output of the power amplifier. Thus, it can provide a compact sound device that has built-in speaker.

The delay arrangement may include a DSP and a RAM. Thus, it can execute delay process with the DSP that the sound device is equipped with.

In another aspect of the invention, a sound device comprises an input terminal that inputs electronic signals; a send output terminal adapted to output electronic signals input on the input terminal to an external area; a primary delay arrangement adapted to delay electronic signals input on the input terminal for a certain time; a return input terminal adapted to input electronic signals output from the send output terminal as digitally processed electronic signals via an external sound device; a mix arrangement adapted to mix (1) electronic signals input on the input arrangement and (2) electronic signals input on the return input terminal; and a main output arrangement adapted to output electronic signals mixed by the mix arrangement. The primary delay arrangement is adapted to delay the signals in order to accommodate a time difference between (1) electronic signals input from the input terminal and (2) electronic signals input from the return input terminal. The time difference between sound input on input terminal and the one that is input from an external sound device on return input terminal can be eliminated. Thus, it can prevent sound quality from decreasing because of time difference.

In one embodiment, the sound device includes a primary delay control arrangement adapted to control whether or not the primary delay arrangement should delay the signals.

Thus, the delay process can be executed only when there is a delay due to an external sound device connected with the return input terminal.

In one embodiment, the sound device includes a return terminal detect arrangement adapted to detect if the return input terminal is connected with an external sound device. The primary delay control arrangement configures the primary delay arrangement (1) to delay the signals when the return terminal detect arrangement detects the return input terminal is connected with an external sound device, or should not delay when the return terminal detect arrangement detects the return input terminal is not connected with an external sound device. Thus, the delay process can be executed only when return input terminal is connected with an external sound device.

In one embodiment, the sound device includes a primary control terminal adapted to configure whether or not the primary delay arrangement should delay the signals. The primary delay control arrangement configures the primary delay arrangement (1) to delay the signals when the primary control terminal configures to delay, and (2) not to delay the signals when the primary control terminal configures not to delay. Thus, a user can configure whether or not it should delay at his/her will.

In one embodiment, the sound device includes a primary delay time configuration arrangement adapted to configure a delay time of the primary delay arrangement. A user can configure delay time of the delay arrangement depending on delay time that external sound device connected with line out terminal has. Thus, the time difference between sound that is output from the sound device and sound that is output from an external sound device can be eliminated.

The primary delay time configuration arrangement may configure a longer delay time of the primary delay arrangement when the return terminal detect arrangement detects the return input terminal is connected with an external sound device than when it detects the return input terminal is not connected with an external sound device. The time difference between sound output from the sound device and the one that is output from an external sound device can be eliminated. Thus, it can prevent sound quality from decreasing.

In one embodiment, the sound device includes a power amplifier that is connected with the main output arrangement. Thus, it can provide a compact sound device that has built-in power amplifier.

In one embodiment, the sound device includes a speaker that is connected with output of the power amplifier. Thus, it can provide a compact sound device that has built-in speaker.

In one embodiment, the delay arrangement includes a DSP and a RAM. Thus, the delay process can be executed with a DSP that the sound device is equipped with.

In one embodiment, the sound device further includes a line out terminal adapted to output electronic signals mixed by the mix arrangement to an external area; and a secondary delay arrangement adapted to delay electronic signals mixed by the mix arrangement for a certain time. The secondary delay arrangement delays the signals in order to accommodate a time difference between (1) electronic signals output from an external sound device connected with the line output terminal and (2) electronic signals output from the main output arrangement. The time difference between sound that is output from the sound device and the one that is output from an external sound device that is connected with the line out terminal can be eliminated. Thus, it can prevent sound quality from decreasing due to time difference.

In one embodiment, the sound device includes a secondary delay control arrangement adapted to configure whether or not the secondary delay arrangement should delay the signals. Thus, the delay process can be executed only when there is delay due to an external sound device that is connected with line out terminal.

In one embodiment, the sound device includes a line terminal detect arrangement adapted to detect if the line out terminal is connected with an external sound device. The secondary delay control arrangement configures the secondary delay arrangement (1) to delay the signals when the line terminal detect arrangement detects the line out terminal is connected with an external sound device, and (2) not to delay the signals when the line terminal detect arrangement detects the line out terminal is not connected with an external sound device. Thus, the delay process can be executed only when there is delay due to an external sound device that is connected with the line out terminal.

In one embodiment, the sound device includes a secondary control terminal adapted to configure whether or not the secondary delay arrangement should delay the signals. The secondary delay control arrangement configures the secondary delay arrangement (1) to delay the signals when the secondary control terminal configures to delay, and (2) not to delay the signals when it configures not to delay. Thus, a user can configure whether or not it should delay at his/her will.

In one embodiment, the sound device includes a secondary delay time configuration arrangement adapted to configure a delay time of the secondary delay arrangement. A user can configure delay time of the delay arrangement depending on delay time that an external sound device connected with line out terminal has. Thus, the time difference between sound that is output from the sound device and sound that is output from an external sound device can be eliminated.

In one embodiment, the secondary delay time configuration arrangement configures longer delay time of the secondary delay arrangement when the line terminal detect arrangement detects the line out terminal is connected with an external sound device than when the line terminal detect arrangement detects the line out terminal is not connected with an external sound device. The time difference between sound that is output from the sound device and the one that is output from an external sound device can be eliminated. Thus, it can prevent sound quality from decreasing.

In one embodiment, the sound device includes a power amplifier connected with the main output arrangement. Thus, it can provide a compact sound device that has built-in power amplifier.

In one embodiment, the sound device includes a speaker that is connected with output of the power amplifier. Thus, it can provide a compact sound device that has built-in speaker.

In one embodiment, the delay arrangement includes a DSP and a RAM. Thus, it can execute delay process with the DSP that the sound device is equipped with.

In another aspect of the invention, a sound system comprises a primary sound device and a secondary sound device. The primary sound device comprises an input terminal that inputs electronic signals, a line out terminal adapted to output electronic signals input on the input terminal to an external area; a delay arrangement adapted to delay electronic signals input on the input terminal for a certain time; and a main output arrangement adapted to output electronic signals that the delay arrangement delayed. The secondary sound device comprises an A/D converter adapted to input analog electronic signals output from a line out terminal of the primary sound device and convert to digital signals; a DSP adapted to process digital signals converted from the A/D converter; a D/A converter adapted to input digital signals processed by the DSP and convert to analog signals; and an output arrangement adapted to output analog signals converted by the D/A converter. The time difference between sound that is output from the primary sound device and the one that is output from the secondary sound device can be eliminated. Thus, it can prevent sound quality from decreasing.

In one embodiment, the sound system includes a delay time configuration arrangement adapted to configure the time from a point when signals input on the A/D converter in the secondary sound device to a point when the signals are output from the D/A converter as delay time via the delay arrangement. It can delay the signal by the length that is created between A/D converter and D/A converter that are provided on the secondary sound device, and eliminate time difference between sound that is output from primary sound device and the one that is output from secondary sound device. Thus, it can prevent sound quality from decreasing.

BRIEF DESCRIPTION OF THE DRAWINGS

FIG. 2 illustrates a block diagram of an electrical configuration of an external sound device according to an embodiment of the invention;

DETAILED DESCRIPTION

Figure 1:
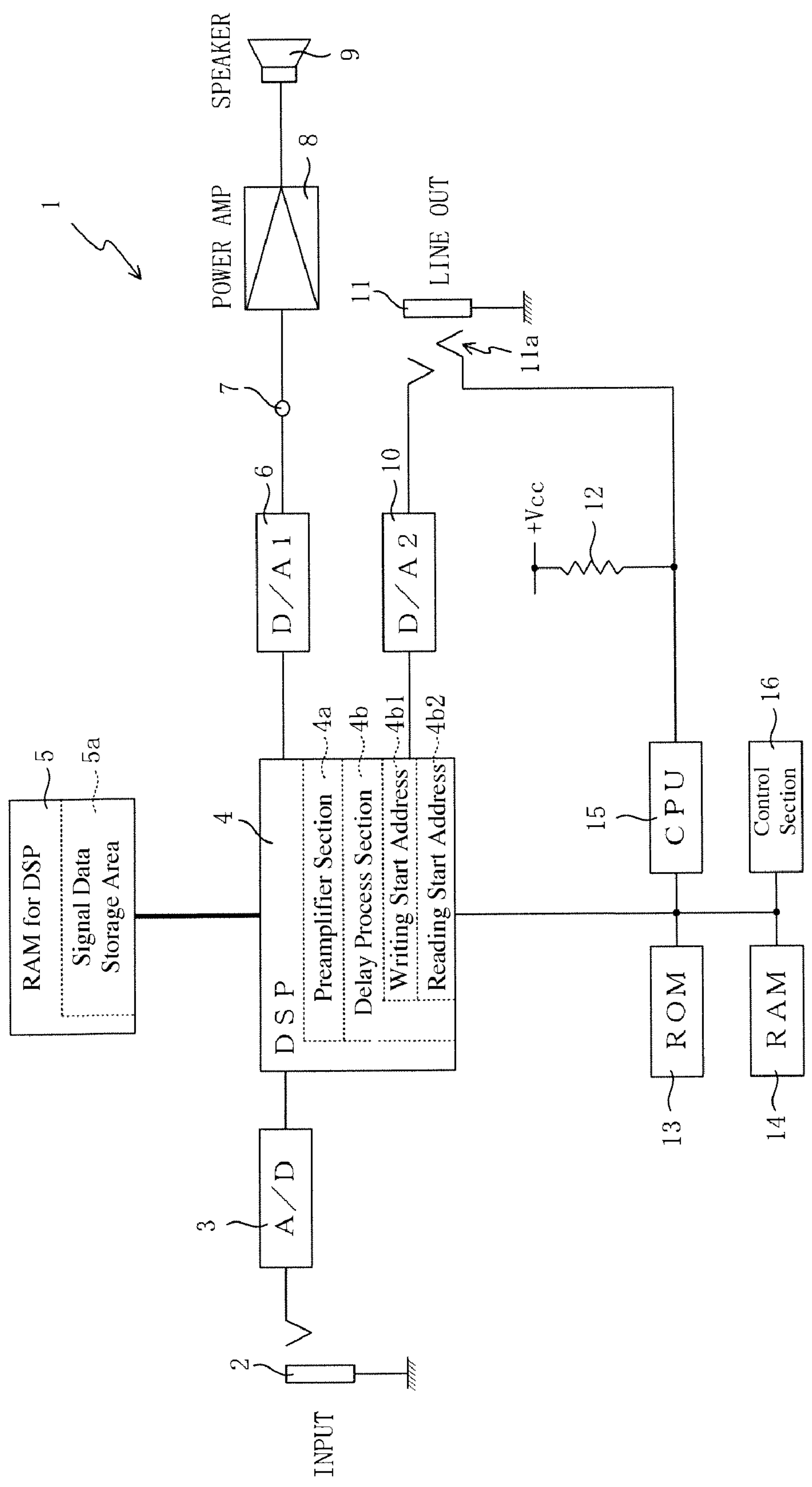
FIG. 1 illustrates a block diagram of an electrical configuration of a sound device according to an embodiment of the invention.

Embodiments of the invention are described with reference to the Figures. FIG. 1 is a block diagram illustrating the electrical configuration of a sound device according to an embodiment of the invention. A sound device 1 is provided with an input terminal 2, an analog-to-digital (A/D) converter 3, a digital signal processor (DSP) 4, a random access memory (RAM) 5 for the DSP 4, a primary digital-to-analog (D/A) converter 6, a main output section 7, a power amplifier 8, a speaker 9, a secondary D/A converter 10, a line out 11, a resistor 12, a read-only memory (ROM) 13, a RAM 14, a central processing unit (CPU) 15, and a control section 16.

The DSP 4, ROM 13, RAM 14, CPU 15, and control section 16 are inter-connected via a bus line. The DSP 4 and RAM 5 for the DSP 4 are inter-connected via a bus line for the DSP 4. The CPU 15 is connected with a switch 11*a* provided on the line out terminal 11.

The input terminal 2 includes at least one jack and can be connected when such line outputs as electric guitar, electric bass, electronic keyboard and electronic piano are inserted by a plug made on one end of a connecting cord, for example.

The A/D converter 3 samples analog signals that are input from the input terminal 2 with a fixed sampling frequency (e.g., 44.1 kHz), and quantizes in a fixed bit quantity (e.g., 16-bit).

The DSP 4 refers to a digital signal process device and processes digital signals that are converted by the A/D converter 3. The DSP 4 is provided with a preamplifier section 4*a* that adjusts frequency property and the level of input signal data, a delay process section 4*b* that executes a delay process of input signal data. The RAM 5 for the DSP 4 is a RAM that stores signal data when the DSP 4 executes a delay process and includes a signal data storage area 5*a* that saves digital signals that were converted by the A/D converter 3. Further, it sends and receives signal data via a designated bus with the DSP 4.

The primary D/A converter 6 converts signal data processed by the DSP 4 to analog signals. The converted analog signals are amplified by the power amplifier 8 via the main output section 7, and operate the speaker 9.

The secondary D/A converter 10 converts signal data processed by the DSP 4 to analog signals. The converted analog signals are output from the line out terminal 11.

The main output section 7 refers to a section where wires are arranged inside one single container along with control circuits equipped with the CPU 15 and the DSP 4 and so forth when the power amplifier 8 is stored. When the power amplifier 8 is stored in another container, it is created with detachable connectors, such as a jack.

The line out terminal 11 includes one or more jacks, and the jacks have a switch 11*a*. This jack may be connected with such line input as an additional speaker equipped with a DSP through connecting cords. For example, when a plug is inserted to the line out terminal 11, the switch 11*a* touches the point where the plug is grounded.

The resistor 12 refers to a pull-up resistor, and this resistor 12 lets the power voltage, Vcc, load on the CPU 15 when no plug is inserted on the line out terminal 11. 0V is loaded on the CPU 15 when a plug is inserted to the line out terminal 11.

The ROM 13 refers to a read-only memory where various control programs that will be executed by the CPU 15 or fixed value data that will be referred at the time of execution are stored. The RAM 14 refers to a random access memory where various kinds of data can be temporarily stored when the CPU 15 executes control programs that are stored on the ROM 13.

The CPU 15 refers to a central processing unit and controls each section that is connected with the bus. It also configures the delay process by the DSP 4 in accordance with the input voltage from the switch 11*a* and the resistor 12. The control section 16 has various kinds of controllers, such as knobs and/or switches, where a user can operate and configure parameters and sound quality effect mode, and so forth.

Now, with reference to FIG. 2, embodiments of external sound devices 21, 51 are described. The external sound device 21, 51 refers to an external sound device that may be used in connection with the sound device 1 of FIG. 1 or the sound device 41 of FIG. 4 described below. The external sound device 21 refers to a powered speaker for addition, and the external sound device 51 refers to an effect deposition device. FIG. 2(*a*) refers to a block diagram illustrating the electrical configuration of the external sound device 21.

The external sound device 21 is provided with an input terminal 22, an A/D converter 23, a DSP 24, a D/A converter 25, a power amplifier 26, a speaker 27, a ROM 28, a RAM 29, a CPU 30, a control section 31. The DSP 24, ROM 28, RAM 29, CPU 30, and control section 31 are inter-connected via a bus.

The input terminal 22 includes at least one jack. The input 22 may be connected with a line out of a sound device through a connecting cord, for example.

The A/D converter 23 samples analog signals that are input from the input terminal 22 with a fixed sampling frequency, and quantizes in a fixed bit quantity.

The DSP 24 refers to a digital signal process device and processes digital signals that are converted by the A/D converter 23.

The D/A converter 25 converts signal data that was processed by the DSP 24 to analog signals. The converted analog signals are amplified by the power amplifier 26 and operate the speaker 27.

The ROM 28 refers to a read-only memory where various control programs executed by the CPU 30 or fixed value data referred at the time of execution are stored. The RAM 29 refers to a random access memory where various kinds of data are temporarily stored when the CPU 30 executes control programs stored on the ROM 28.

The CPU 30 refers to a central processing unit and controls each section that is connected with the bus. The control section 31 has various kinds of controllers, such as knobs and/or switches, where a user can operate and configure parameters and sound quality effect mode, and so forth.

FIG. 2(*b*) refers to a block diagram illustrating the electrical configuration of an external sound device 51. FIG. 2(*b*) uses the same reference numerals for like elements in FIG. 2(*a*).

The external sound device 51 is provided with an input terminal 52, a DSP 53, and a line out terminal 54. The DSP 53, ROM 28, RAM 29, CPU 30, and control section 31 are inter-connected via a bus.

The input terminal 52 includes at least one jack. The input terminal 52 may be connected with a line out of a sound device through a connecting cord, for example.

The DSP 53 refers to a digital signal process device and processes digital signals that are converted by the A/D converter 23. In an effecter section 53*b*, various effects including distortion, delay, reverb, and so forth may be added on input signals.

The line out terminal 54 includes at least one jack. The line out terminal 54 is connected with a line input of a sound device through a connecting cord, for example. Analog signals converted by the D/A converter 25 are output from the line out terminal 54.

The flow when the sound device 1 of FIG. 1 is connected with the external sound device 21 will now be described. The line out terminal 11 of the sound device 1 and the input terminal 22 of the external sound device 21 are connected with a connecting cable. Analog signals input on the input terminal 2 of the sound device 1 are converted by the A/D converter 3 to digital signals and output on the DSP 4. The preamplifier section 4*a* of the DSP 4 adjusts frequency property and level of the input signal data and outputs on the secondary D/A converter 10. The secondary D/A converter 10 converts signal data processed by the DSP 4 to analog signals, and outputs on the line out terminal 11. Analog signals input on the input terminal 22 of the external sound device 21 connected with the line out terminal 11 are converted by the A/D converter 23 to digital signals and output on the DSP 24. The preamplifier section 24*a* of the DSP 24 adjusts frequency property and level of the input signal data and outputs on the D/A converter 25. The D/A converter 25 converts signal data processed by the DSP 24 to analog signals. Converted analog signals are amplified by the power amplifier 26, and the speaker 27 will be operated.

The processing time of each block in the electrical configuration will now be described. A block can be categorized as blocks that process analog signals and blocks that process digital signals. Blocks that process analog signals refer to each power amplifier or each speaker, and blocks that process digital signals refer to each A/D converter or each DSP, or each D/A converter.

There are little signal delays in the blocks that process analog signals. There may be, however, considerable signal delays in the blocks that process digital signals from the point when signals are input to the point when they are output.

It is also not unusual that there are larger delays in the A/D converter and the D/A converter than in the DSP among the blocks that process digital signals. In this section, we hypothetically define the delay time in one A/D converter or D/A converter as T (seconds). This delay time T varies among components, and sometimes becomes a few milliseconds.

When we calculate the delay time from the point when analog signals are input on the input terminal 2 of the sound device 1 to the point when they generate sound from the speaker 9, there are the A/D converter 3 and the primary D/A converter 6 on the route between the point where analog signals are input on the input terminal 2 of the sound device 1 to the point where they generate sound from the speaker 9. Thus, its delay time equals 2T (seconds).

Similarly, when we calculate delay time from the point when analog signals are input on the input terminal 2 to the point when they are output on the line out terminal 11, there are the A/D converter 3 and the secondary D/A converter 10 on its route. Thus, its delay time equals 2T (seconds).

When we calculate delay time in the external sound device 21, there are the A/D converter 23 and the D/A converter 25 on the route between the point where analog signals are input on the input terminal 22 of the sound device 21 to the point where they generate sound from the speaker 27. Thus, its delay time equals 2T (seconds).

When we connect the external sound device 21 with the line out terminal 11 of the sound device 1, delay time from the point where analog signals are input on the input terminal 2 of the sound device 1 to the point where they generate sound from the speaker 27 of the external sound device 21 equals 2T+2T=4T (seconds).

Therefore, sound that is generated from the speaker 9 of the sound device 1 and the one that is generated from the speaker 27 of the external sound device 21 will have 4T−2T=2T (seconds) of time difference. This time difference differentiates sound phases of each speaker, and those phases interfere each other. They may change sound quality or rather decrease the sound quality.

Then we have the DSP 4 of the sound device 1 execute delay process, and delay output from the main output section 7 by 2T (seconds) longer than output from the line out terminal 11. It makes delay time from the point when analog signals are input on the input terminal 2 of the sound device 1 to the point when they generate sound from the speaker 9 by 4T (seconds). This 4T (seconds) makes sound generated from the speaker 27 of the external sound device 21 at the same timing. It eliminates sound interference, and maintains fine sound quality.

The delay process that the DSP 4 executes will now be described. The DSP 4 is equipped with the preamplifier section 4*a* that adjusts frequency property and level of signals and the delay process section 4*b* that executes delay process of the signal data. The delay process section 4*b* stores Writing Start Address 4*b*1 and Reading Start Address 4*b*2.

The Writing Start Address 4*b*1 indicates an address where the device writes signal data on Signal Data Save Area 5*a* of the RAM 5 for the DSP 4, and the Reading Start Address 4*b*2 indicates an address where the device reads signal data from the Signal Data Save Area 5*a*.

When the device receives instruction from the CPU 15 to initiate delay process, difference between Writing Start Address 4*b*1 and Reading Start Address 4*b*2 will be created based on its delay time. This difference of addresses generates a delay time.

The preamplifier section 4*a* adjusts frequency property or level of digital signals that were input from the A/D converter 3, and outputs them on the delay process section 4*b*. The delay process section 4*b* executes delay process in accordance with a configuration that the CPU 15 had set. It outputs signal data after delay process on the primary D/A converter 6, and another signal data without executing delay process on the secondary D/A converter 10.

The delay process is initiated when the CPU 15 sets the configuration of delay process. The delay process section 4*b*, first of all, outputs signal data that was input from the preamplifier section 4*a* on the secondary D/A converter 10 as it is, and writes signal data on the Writing Start Address 4*b*1 of the RAM 5 for the DSP 4. When writing is completed, address values on the Writing Start Address 4*b*1 are renewed to be the one where the next writing will be initiated. When the next signal data is written on the updated address, the address values will be updated again. The signal data that was input from the preamplifier 4*a* repeats this process until delay process is terminated, and is written on the RAM 5 for the DSP 4 one after another.

Furthermore, when it equals delay time that is configured by the CPU 15, the delay process section 4*b* reads signal data from the Reading Start Address 4*b*2 on the RAM 5 for the DSP 4, and when reading is completed, address values on the Reading Start Address 4*b*2 are renewed to be the one where the next reading will be initiated. When the next signal data is read from the updated address, the address values is updated again. The signal data is repeatedly read from the RAM 5 for the DSP 4 one after another until the delay process is terminated and all the written signal data is read. Then, the delay process section 4*b* outputs signal data read from the RAM 5 for the DSP 4 on the primary D/A converter 6.

Figure 3:
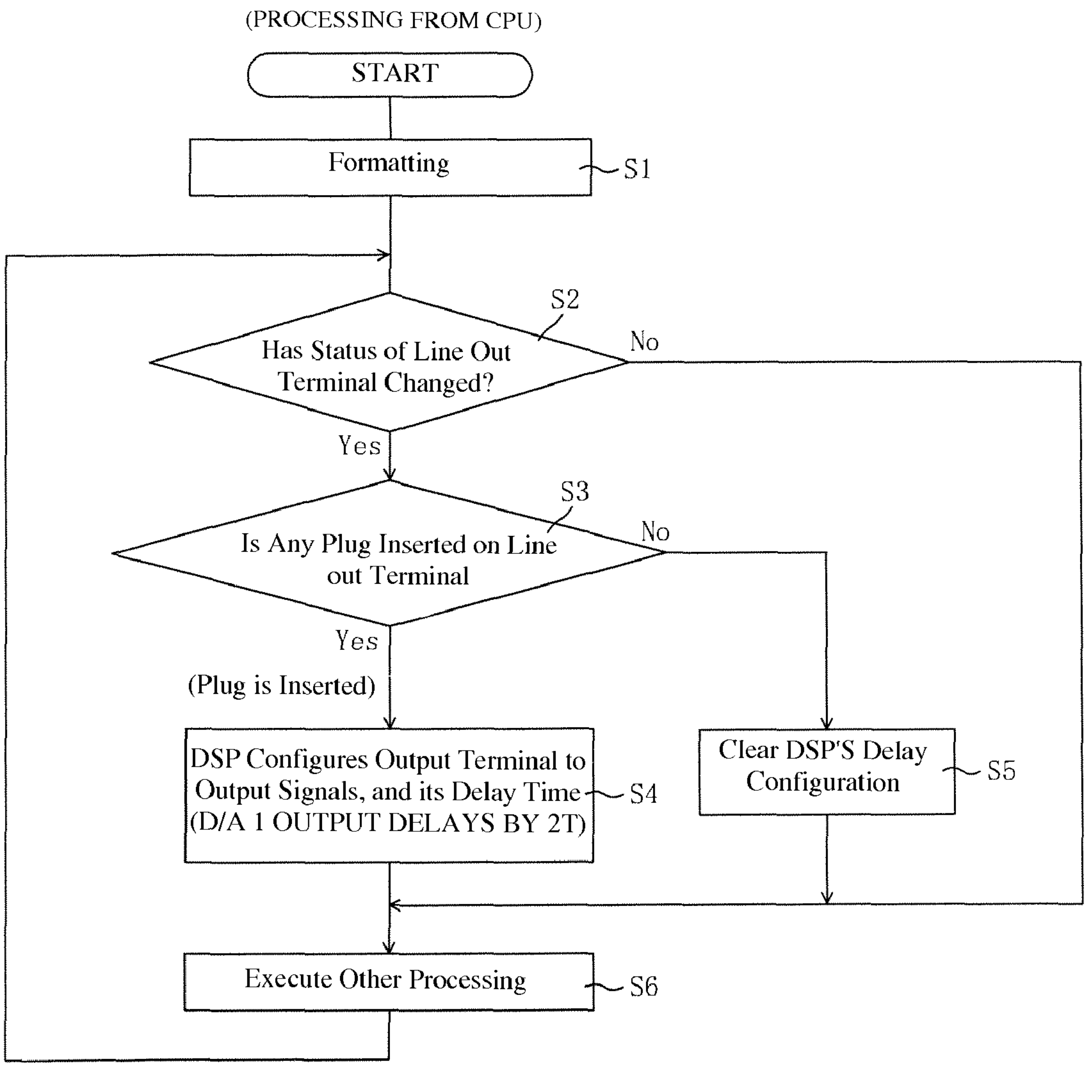
FIG. 3 is a flow chart illustrating an embodiment of the main processing of the sound device of FIG. 1.

The process that the CPU 15 executes will now be described with reference to FIG. 3. FIG. 3 refers to a flow chart illustrating the main processing. It is activated when the sound device 1 is turned on, and it is repeated until the power is cut off.

In this main processing, first of all, format will be done (S1). Formatting includes the DSP 4 formatting, the RAM 5 for the DSP 4 formatting, the RAM 14 formatting, and so forth (51). Next, the CPU 15 determines if status has been changed such as plug is inserted or detached on the line out terminal 11, for example (S2).

In the S2 step, if the status of the line out terminal 11 has been changed (S2: YES), the CPU 15 determines if any plug is inserted on the line out terminal 11 (S3). If the status of the line out terminal 11 has not been changed (S2: NO), the CPU 15 executes other processes (S6).

In the S3 step, if any plug is determined to have been inserted on the line out terminal 11 (S3: YES), the CPU 15 determines that an external sound device 21 is connected, and configures the DSP 4 to delay signal data that will be output on the primary D/A converter 6 by 2T (seconds) (S4).

If no plug is inserted on the line out terminal 11 (S3: NO), the device determines that no external sound device is connected and configures (or clears) the DSP 4 not to execute the delay process (S5). When the CPU 15 has completed either S4 or S5 processing, it then executes other processing (S6).

In other processing (S6), the CPU 15 executes processes other than the delay process (S6), and returns to the S2 step. Other processes refers to processes that detect if the control terminal that configures such things as volume or effects is operated, and executes some other processes accordingly.

Figure 4:
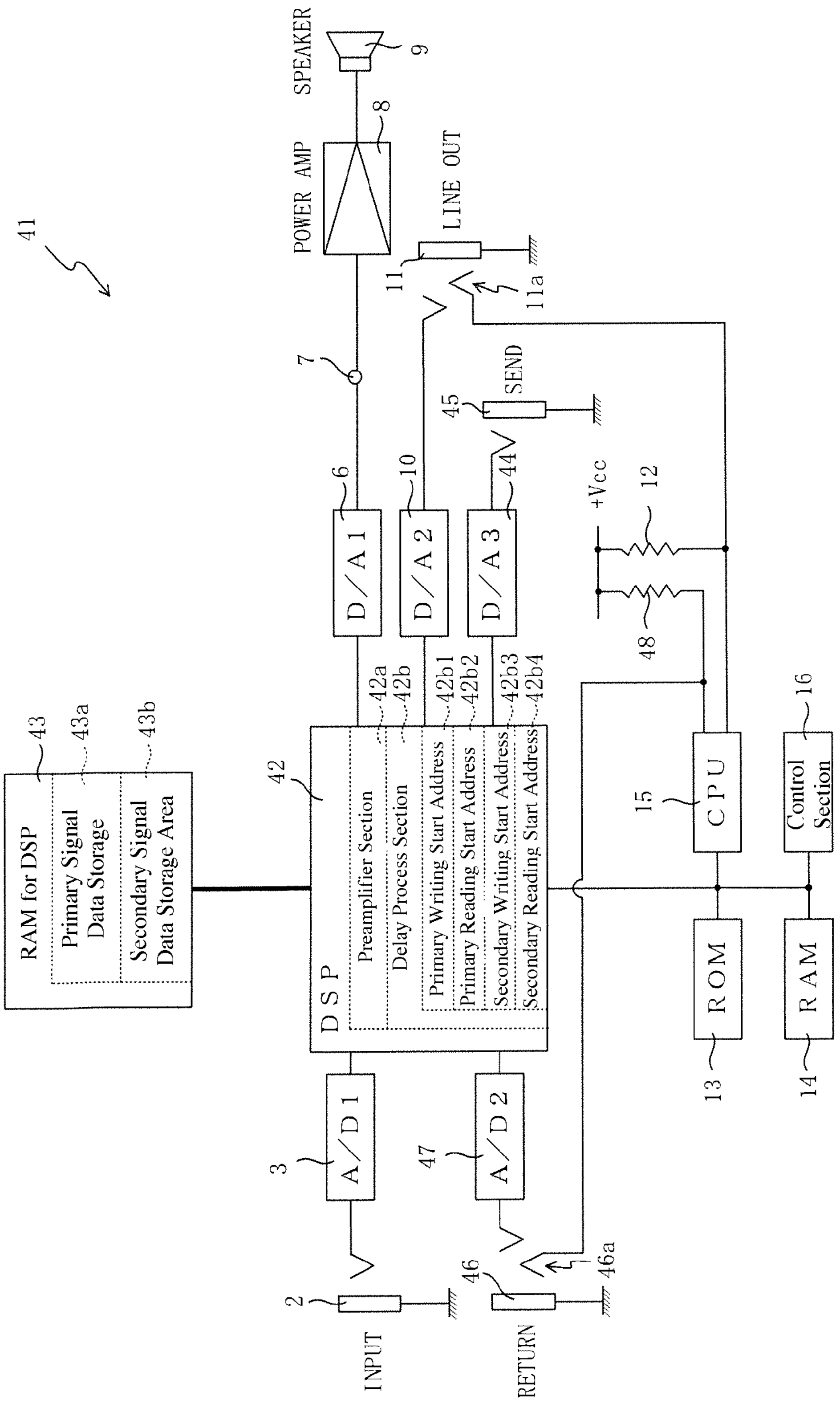
FIG. 4 illustrates a block diagram of an electrical configuration of a sound device according to another embodiment of the invention.

Another embodiment of a sound device will now be described with reference to FIG. 4. The sound device 41 can be utilized while an external sound device, such as external sound device 21, is connected with another external sound device, such as external sound device 51, simultaneously. FIG. 4 refers to a block diagram illustrating the electrical configuration of the sound device 41 according to an embodiment of the present invention. Like reference numerals are used for components that are similar to those of the embodiment illustrated in FIG. 1.

The sound device 41 is provided with a DSP 42, RAM 43 for the DSP 42, a tertiary D/A converter 44, a send output terminal 45, a return input terminal 46, a secondary A/D converter 47, and a resistor 48. The primary A/D converter 3 is the same one as the A/D converter 3 shown on FIG. 1.

The DSP 42, ROM 13, RAM 14, CPU 15, and control section 16 are inter-connected via a bus. The DSP 42 and RAM 43 for the DSP 42 are inter-connected via a designated bus. The CPU 15 is connected with the switch 11*a* that is provided on the line out terminal 11 and a switch 46*a* that is formed on the return input terminal 46.

The DSP 42 refers to a digital signal processing device and processes digital signals converted by the primary A/D converter 3 and the secondary A/D converter 47. The DSP 42 is provided with a preamplifier section 42*a* that adjusts frequency property and level of input signal data and a delay process section 42*b* that executes delay process of input signal data.

The RAM 43 for the DSP 42 refers to a RAM that saves signal data when the DSP 42 executes the delay process. It is equipped with the following components:

a Primary Signal Data Save Area 43*a* that saves digital signals converted by the primary A/D converter 3; and a Secondary Signal Data Save Area 43*b* that saves digital signals that were the mixture of (a) digital signals converted by the secondary A/D converter 47, which the external sound device 51 deposited its effect, and (b) digital signals read from the primary Signal Data Save Area 43*a*.

The RAM 43 for the DSP 42 sends and receives signal data with the DSP 42 via the designated bus.

The tertiary D/A converter 44 converts signal data that the DSP 42 processed to analog signals. The converted analog signals are output from the send output terminal 45.

The send output terminal 45 includes at least one jack. It may be connected with line input of effecter equipped with the DSP through a connecting cord, for example.

The return input terminal 46 includes at least one jack. The switch 46*a* is provided on it. An effect deposition device, such as the external sound device 51, may be connected between this return input terminal 46 and the send output terminal 45. The switch 46*a* is grounded when a plug is inserted into the return input terminal 46 just like the line out terminal 11.

The resistor 48 refers to a pull-up resistor. When no plug is inserted on the return input terminal 46, the power voltage Vcc is loaded on the CPU 15 through the resistor 48. When any plug is inserted on the return input terminal 46, no voltage will be loaded on the CPU 15 (0V).

The flow when the external sound device 21 is connected with the line out terminal 11 of the sound device 41 and the external sound device 51 is connected between the send output terminal 45 and the return input terminal 46 will now be described.

The flow when the external sound device 51 is connected with the sound device 41 is first described. The send output terminal 45 of the sound device 41 and the input terminal 52 of the external sound device 51 are connected with each other through a connecting cable. The line out terminal 54 of the external sound device 51 and the return input terminal 46 of the sound device 41 are connected with each other through a connecting cable. Analog signals input on the input terminal 2 of the sound device 41 are converted by the primary A/D converter 3 to digital signals and output on the DSP 42. The preamplifier section 42*a* of the DSP 42 adjusts frequency property or level of the input signal data, and outputs on the tertiary D/A converter 44. The tertiary D/A converter 44 converts digital signals to analog signals and outputs on the send output terminal 45. Analog signals input on the input terminal 52 of the external sound device 51 that is connected with the send output terminal 45 are converted by the A/D converter 23 on digital signals and output on the DSP 53. The preamplifier section 53*a* of the DSP 53 adjusts frequency property or level of the input signal data, deposits sound effects through the effecter section 53*b*, and outputs on the D/A converter 25. The D/A converter 25 converts the digital signals to analog signals, and the analog signals are output on the line out terminal 54.

Analog signals input on the return input terminal 46 of the sound device 41 that is connected with the line out terminal 54 are converted by the secondary A/D converter 47 to digital signals and output on the DSP 42.

The DSP 42 is equipped with the preamplifier section 42*a* and the delay process section 42*b*. The delay process section 42*b* stores the Primary Writing Start Address 42*b*1, the Primary Reading Start Address 42*b*2, the Secondary Writing Start Address 42*b*3, and the Secondary Reading Start Address 42*b*4. The Primary Writing Start Address 42*b*1 indicates an address where digital signals are written on the Primary Signal Data Save Area 43*a*. The Primary Reading Start Address 42*b*2 indicates an address where digital signals are read from the Primary Signal Data Save Area 43*a*. The Secondary Writing Start Address 42*b*3 indicates an address where digital signals are written on the Secondary Signal Data Save Area 43*b*. The Secondary Reading Start Address 42*b*4 indicates an address where digital signals are read from the Secondary Signal Data Save Area 43*b*.

When the external sound device 21 or the external sound device 51 is connected, the device outputs delayed signals by writing signal data on a certain location indicated by the writing start address and reading signal data from a certain location indicated by the reading start address.

The delay time when the sound device 41 is connected with the external sound device 51 will now be described. When we calculate delay time from the point when analog signals input on input terminal 2 were converted to digital signals by the primary A/D converter 3 of the sound device 41 to the point when they were output on the send output terminal 45, there is the tertiary D/A converter 44 on the route. The delay time equals 1T (seconds). When we calculate delay time from the point when the signals are input on input terminal 52 of the external sound device 51 to the point when they are output on the line out terminal 54, there are the A/D converter 23 and the D/A converter 25 on the route. The delay time equals 2T (seconds). When we calculate delay time from the point when the signals output from the line out terminal 54, and input on the return input terminal 46 of the sound device 41, to the point when they were converted by the secondary A/D converter 47, there is the secondary A/D converter 47 on the route. The delay time equals 1T (seconds).

Therefore, among the DSP 42 of the sound device 41, signals returned from the external sound device 51 to the DSP 42 is 4T (seconds) later than the original signals input on the DSP 42.

When the external sound device 51 is connected, the DSP 42 delays digital signals converted by the primary A/D converter 3 by 4T (seconds) and mixes with the signals that were returned from the external sound device 51.

The delay time between sound that is generated from the speaker 27 of the external sound device 21 that is connected with the line out terminal 11 of the sound device 41 and sound that is generated from the speaker 9 of the sound device 41 equals, as described above with reference to FIG. 1, 2T (seconds). Sound that is generated from the speaker 9 of the sound device 41 should be delayed by 2T (seconds) when the external sound device 21 is connected.

The sound device 41 delays output from the main output section 7 by 2T (seconds) compared with output from the line out terminal 11 when only the external sound device 21 is connected and the external sound device 51 is not connected. When the external sound device 21 is not connected and only the external sound device 51 is connected, digital signals that were converted by the primary A/D converter 3 should be delayed by 4T (seconds) and mixed with signal data returned from the external sound device 51. When the external sound device 21 and the external sound device 51 are both connected with the sound device 41, digital signals converted by the primary A/D converter 3 should be delayed by 4T (seconds) and mixed with signal data returned from the external sound device 51. The mixed signals should be output on the line out terminal 11 and output on the main output section 7 with 2T (seconds) of delay.

Figure 5:
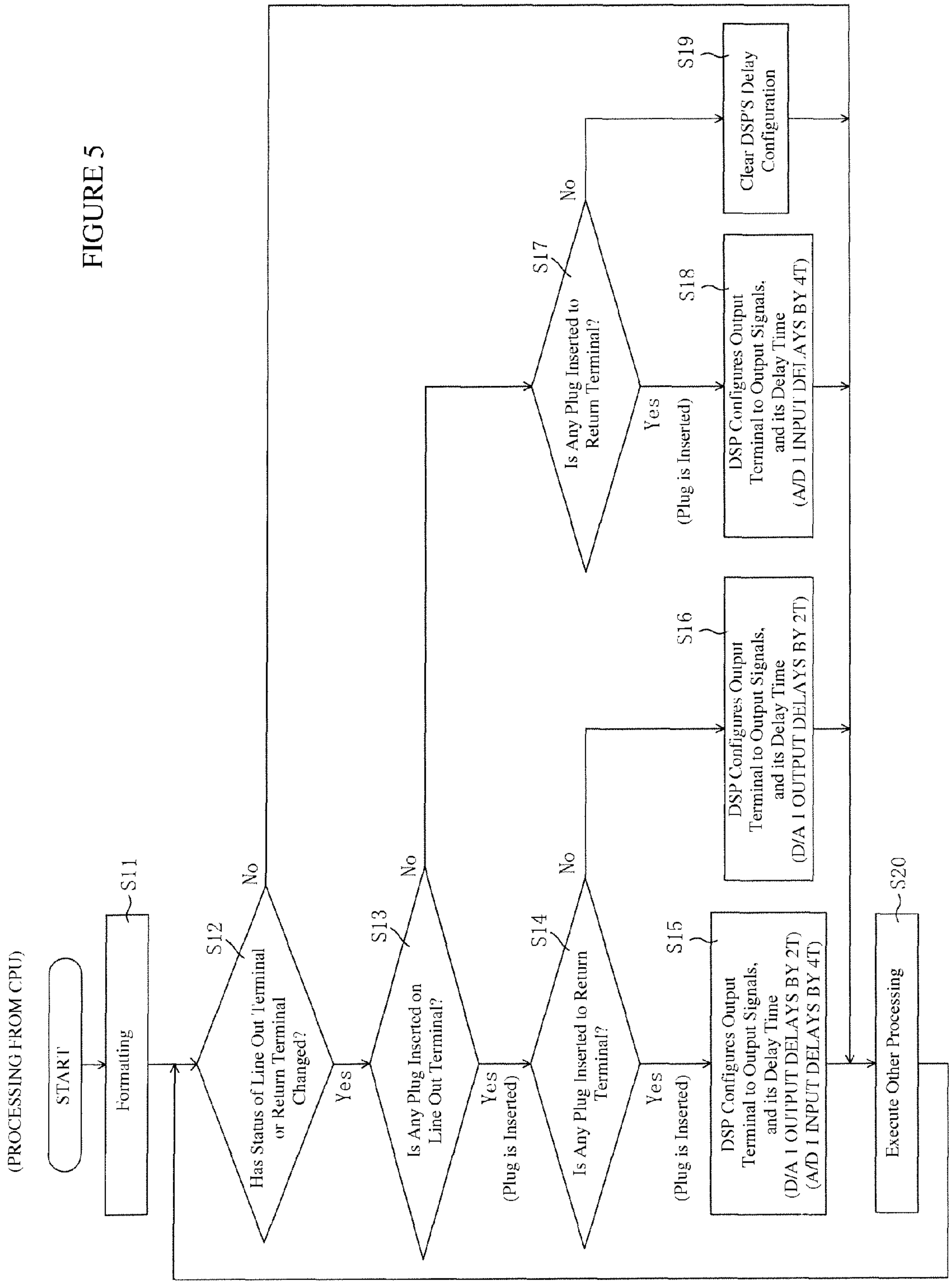
FIG. 5 is a flow chart illustrating an embodiment of the main processing of the sound device of FIG. 4.

An embodiment of the process that CPU 15 executes will now be described with reference to FIG. 5. FIG. 5 refers to a flow chart illustrating an embodiment of the main processing. This process is activated when power for the sound device 41 is turned on and repeated until power is cut off.

The main processing, first of all, executes formatting (S11). Formatting includes the DSP 42 formatting, the RAM 43 for the DSP 42 formatting, the RAM 14 formatting, and so forth. Next, the CPU 15 determines if status is changed such as a plug is inserted or detached to or from either the line out terminal 11 or the return input terminal 46 (S12).

In the S12 step, if status of the line out terminal 11 has been changed (S12: YES), the CPU 15 determines if any plug is inserted to the line out terminal 11 (S13). If status of the line out terminal 11 has not been changed (S12: NO), the CPU 15 executes other processing (S20).

In the S13 step, if any plug is inserted on the line out terminal 11 (S13: YES), the CPU 15 determines if any plug is inserted on the return input terminal 46 (S14). If no plug is inserted on the line out terminal 11 (S13: NO), the CPU 15 determines if any plug is inserted on the return input terminal 46 (S17).

In the S14 step, if any plug is inserted on the return input terminal 46 (S14: YES), the CPU 15 determines that the external sound device 21 and the external sound device 51 are both connected with sound device 41 and saves signal data converted by the primary A/D converter 3 on the Primary Signal Data Save Area 43*a* accordingly. Signal data read from the Primary Signal Data Save Area 43*a* with 4T (seconds) of delay is mixed with signal data added effects in the external sound device 51 and converted by the secondary A/D converter 47. The mixed signals are output on the secondary D/A converter 10 and saved on the secondary Signal Data Save Area 43*b* accordingly. The CPU 15 further configures the DSP 42 to output signals read from the Primary Signal Data Save Area 43*a* with 2T (seconds) of delay time on the primary D/A converter 6 (S15).

In the S14 determination processing step, if no plug was inserted on the return input terminal 46 (S14: NO), the CPU 15 determines that only the external sound device 21 is connected and the external sound device 51 is not. It configures the DSP 42 (1) to delay signal data output on the primary D/A converter 6 by 2T (seconds) and (2) not to delay signal data output on the secondary D/A converter 10 (S16).

In the S17 determination processing step, if any plug is inserted to the return input terminal 46 (S17: YES), the CPU 15 determines that the external sound device 21 is not connected and only the external sound device 51 is connected. It configures the DSP 42 to (1) delay signal data input from the primary A/D converter 6 by 4T (seconds), (2) mix signal data converted by the secondary A/D converter 47, and (3) output on the primary D/A converter 6 (S18).

If no plug was inserted to the return input terminal 46 (S17: NO), the CPU 15 determines that neither external sound device is connected and configures the DSP 42 to execute no delay process (S19). When S15, S16, S18 or S19 processing is completed, it executes other processing (S20), and returns to the S12 processing step. Other processing refers to the same processing as that described above with reference to FIG. 3.

The S4 processing step on the flow chart of FIG. 3 illustrates an embodiment of a delay time configuration. The S15, S16, and S18 processing steps on the flow chart of FIG. 5 illustrate embodiments of primary and secondary delay time configurations. Steps S3 through S5 processing steps on the flow chart of FIG. 3 illustrate embodiments of delay control. The S13 through S19 processing steps on the flow chart of FIG. 5 illustrate embodiments of primary and secondary delay control.

The above is a description of embodiments of the Invention. The application of the invention, however, should not be limited by the embodiments, and it is easy to assume that various modifications can be applied as long as they will not deviate from the point of the invention.

For example, in the embodiments, delay process by the DSP 42 first detects if any plug is inserted to the line out terminal 11 or the return input terminal 46 and then executes. It is applicable to have the control section 16 equipped with a control terminal to determine if delay process should be executed, and let a user control the process.

Furthermore, delay time of the DSP 42 is fixed in the embodiment. It is applicable to have the control section 16 equipped with a switch that can select a certain pre-fixed choices of delay time, such as certain delay times that will be used quite often, and let the user control the process.

Furthermore, the delay time of the DSP 42 is fixed in the above-described embodiments. It is applicable to have the control section 16 equipped with one or more control knobs that can select a certain delay time within a pre-determined range, a certain delay time range that will be used quite often, and let the user control the process.

Furthermore, the time difference may be created between sound from the speakers 9, 27 due to sound signals that were input on the sound device 41 when the sound device 41 is connected with the external sound device 21 through delay process by the sound device 41. Even when the delay process is executed to eliminate the time difference of sound from the speaker 9 and the speaker 27, if (1) the speaker 9 and the speaker 27 are to be stacked or (2) the speaker 9 and the speaker 27 are to be positioned physically apart from each other, delay time will be created based on physical distance between listener and each speaker. It is applicable to add such process that eliminates the listener's delay time through delay process of the DSP 42 of the sound device 41.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A sound device, comprising:

an input terminal that inputs electronic signals;

a send output terminal adapted to output electronic signals input on the input terminal to an external area;

a primary delay arrangement adapted to delay electronic signals input on the input terminal for a certain time;

a return input terminal adapted to input electronic signals output from the send output terminal as digitally processed electronic signals via an external sound device;

a mix arrangement adapted to mix (1) electronic signals input on the input terminal and (2) electronic signals input on the return input terminal; and a main output arrangement adapted to output electronic signals mixed by the mix arrangement;

wherein the primary delay arrangement is adapted to delay the signals in order to accommodate a time difference between (1) electronic signals input from the input terminal and (2) electronic signals input from the return input terminal.

2. The sound device of claim 1, further comprising:

a primary delay control arrangement adapted to control whether or not the primary delay arrangement should delay the signals.

3. The sound device of claim 2, further comprising:

a return terminal detect arrangement adapted to detect if the return input terminal is connected with an external sound device;

wherein the primary delay control arrangement controls the primary delay arrangement (1) to delay the signals when the return terminal detect arrangement detects the return input terminal is connected with an external sound device, and (2) not to delay the signals when the return terminal detect arrangement detects the return input terminal is not connected with an external sound device.

4. The sound device of claim 2, further comprising:

a primary control terminal adapted to configure whether or not the primary delay arrangement should delay the signals;

wherein the primary delay control arrangement configures the primary delay arrangement (1) to delay the signals when the primary control terminal configures to delay, and (2) not to delay the signals when the primary control terminal configures not to delay.

5. The sound device of claim 1, further comprising:

a primary delay time configuration arrangement adapted to configure a delay time of the primary delay arrangement.

6. The sound device of claim 5, wherein the primary delay time configuration arrangement configures longer delay time of the primary delay arrangement when the return terminal detect arrangement detects the return input terminal is connected with an external sound device than when it detects the return input terminal is not connected with an external sound device.

7. The sound device of claim 1, further comprising:

a power amplifier connected with the main output arrangement.

8. The sound device of claim 7, further comprising:

a speaker connected with output of the power amplifier.

9. The sound device of claim 1, wherein the delay arrangement includes a DSP and a RAM.

10. The sound device of claim 1, further comprising:

a line out terminal adapted to output electronic signals mixed by the mix arrangement to an external area; and a secondary delay arrangement adapted to delay electronic signals mixed by the mix arrangement for a certain time;

wherein the secondary delay arrangement delays the signals in order to accommodate a time difference between (1) electronic signals output from an external sound device connected with the line output terminal and (2) electronic signals output from the main output arrangement.

11. The sound device of claim 10, further comprising:

a secondary delay control arrangement adapted to configure whether or not the secondary delay arrangement should delay the signals.

12. The sound device of claim 11, further comprising:

a line terminal detect arrangement adapted to detect if the line out terminal is connected with an external sound device;

wherein the secondary delay control arrangement configures the secondary delay arrangement (1) to delay the signals when the line terminal detect arrangement detects the line out terminal is connected with an external sound device, and (2) not to delay the signals when the line terminal detect arrangement detects the line out terminal is not connected with an external sound device.

13. The sound device of claim 11, further comprising:

a secondary control terminal adapted to configure whether or not the secondary delay arrangement should delay the signals;

wherein the secondary delay control arrangement configures the secondary delay arrangement (1) to delay the signals when the secondary control terminal configures to delay, and (2) not to delay the signals when it configures not to delay.

14. The sound device of claim 10, further comprising:

a secondary delay time configuration arrangement adapted to configure delay time of the secondary delay arrangement.

15. The sound device of claim 14, wherein the secondary delay time configuration arrangement configures longer delay time of the secondary delay arrangement when the line terminal detect arrangement detects the line out terminal is connected with an external sound device than when the line terminal detect arrangement detects the line out terminal is not connected with an external sound device.

16. The sound device of claim 10, further comprising:

a power amplifier connected with the main output arrangement.

17. The sound device of claim 16, further comprising:

a speaker connected with output of the power amplifier.

18. The sound device of claim 10, wherein the delay arrangement includes a DSP and a RAM.

* * * * *